United States Patent
Kim et al.

(10) Patent No.: US 10,836,394 B2
(45) Date of Patent: Nov. 17, 2020

(54) APPARATUS AND METHOD FOR LANE CHANGE CONTROL

(71) Applicants: HYUNDAI MOTOR COMPANY, Seoul (KR); KIA MOTORS CORPORATION, Seoul (KR)

(72) Inventors: Hoi Won Kim, Gwacheon-si (KR); Jae Yong Jeon, Gyeonggi-do (KR); Beom Jun Kim, Seoul (KR); Dong Eon Oh, Seoul (KR); Chan Il Park, Chungcheongbuk-do (KR); Jin Su Jeong, Suwon-si (KR); Doo Jin Um, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/204,362

(22) Filed: Nov. 29, 2018

(65) Prior Publication Data

US 2019/0315360 A1  Oct. 17, 2019

Related U.S. Application Data

(60) Provisional application No. 62/655,831, filed on Apr. 11, 2018.

(30) Foreign Application Priority Data

Oct. 8, 2018  (KR) .......................... 10-2018-0119957

(51) Int. Cl.
*B60W 30/085* (2012.01)
*B60W 30/095* (2012.01)
(Continued)

(52) U.S. Cl.
CPC .... *B60W 30/18163* (2013.01); *B60W 30/085* (2013.01); *B60W 30/0956* (2013.01); (Continued)

(58) Field of Classification Search
CPC ....... B60W 30/18163; B60W 30/0956; B60W 50/10; B60W 40/09; B60W 50/14; (Continued)

(56) References Cited

U.S. PATENT DOCUMENTS 5,521,579 A  5/1996 Bernhard
6,055,467 A  4/2000 Mehring et al.
(Continued)

FOREIGN PATENT DOCUMENTS

DE  198 21 122 A1  6/1999
DE  101 14 187 A1  9/2002
(Continued)

OTHER PUBLICATIONS

European Search Report dated Jul. 1, 2019 from the corresponding European Application No. 18210398.6, 9 pages.
(Continued)

*Primary Examiner* — Behrang Badii
*Assistant Examiner* — Hossam M Abd El Latif
(74) *Attorney, Agent, or Firm* — Brinks Gilson & Lione

(57) ABSTRACT

An apparatus for lane change control for a vehicle may include: a determination device to determine lane change conditions for a first vehicle and a second vehicle, which are each travelling in a target lane to which a host vehicle performs a lance change; and a controller to perform the lane change control for the host vehicle when both the lane change conditions for the first and second vehicles are met. In particular, the first vehicle is located behind the host vehicle, and the second vehicle is located in front of the host vehicle.

16 Claims, 10 Drawing Sheets

(51) Int. Cl.
*B60W 30/18* (2012.01)
*B60W 40/09* (2012.01)
*B60W 50/00* (2006.01)
*B60W 50/08* (2020.01)
*B60W 50/14* (2020.01)
*B60W 50/10* (2012.01)
*G08G 1/16* (2006.01)

(52) U.S. Cl.
CPC .......... *B60W 40/09* (2013.01); *B60W 50/085* (2013.01); *B60W 50/10* (2013.01); *B60W 50/14* (2013.01); *G08G 1/167* (2013.01); *B60W 2050/146* (2013.01); *B60W 2554/801* (2020.02); *B60W 2554/804* (2020.02); *B60W 2720/106* (2013.01)

(58) Field of Classification Search
CPC ............. B60W 30/085; B60W 50/085; B60W 2050/146; B60W 2550/308; B60W 2550/302; B60W 2720/106; G08G 1/167
USPC .......................................................... 701/96
See application file for complete search history.

(56) References Cited

U.S. PATENT DOCUMENTS

| | | | |
|---|---|---|---|
| 6,473,678 B1 | 10/2002 | Satoh et al. | |
| 6,842,687 B2 | 1/2005 | Winner et al. | |
| 7,363,140 B2 | 4/2008 | Ewerhart et al. | |
| 7,821,421 B2 | 10/2010 | Tamir et al. | |
| 8,073,595 B2 | 12/2011 | Tabata et al. | |
| 8,521,352 B1 | 8/2013 | Ferguson et al. | |
| 9,527,441 B2 | 12/2016 | Matsumura | |
| 10,183,668 B2 | 1/2019 | Takae | |
| 10,449,856 B2 | 10/2019 | Kojima | |
| 10,558,213 B2 | 2/2020 | Sato et al. | |
| 2003/0163239 A1 | 8/2003 | Winner et al. | |
| 2005/0256630 A1 | 11/2005 | Nishira et al. | |
| 2006/0009910 A1 | 1/2006 | Ewerhart et al. | |
| 2007/0255474 A1 | 11/2007 | Hayakawa et al. | |
| 2008/0172153 A1 | 7/2008 | Ozaki et al. | |
| 2009/0005933 A1 | 1/2009 | Tabata et al. | |
| 2009/0132125 A1 | 5/2009 | Yonezawa et al. | |
| 2009/0299573 A1 | 12/2009 | Thrun et al. | |
| 2010/0010733 A1* | 1/2010 | Krumm ............... | G01C 21/3484 701/533 |
| 2010/0042282 A1 | 2/2010 | Taguchi et al. | |
| 2012/0296522 A1 | 11/2012 | Otuka | |
| 2013/0063595 A1 | 3/2013 | Niem | |
| 2014/0074356 A1* | 3/2014 | Bone ...................... | G08G 1/167 701/41 |
| 2015/0006012 A1 | 1/2015 | Kammel et al. | |
| 2015/0019063 A1 | 1/2015 | Lu et al. | |
| 2015/0094899 A1 | 4/2015 | Hackenberg et al. | |
| 2015/0148985 A1 | 5/2015 | Jo | |
| 2015/0166062 A1* | 6/2015 | Johnson ................ | B60W 10/20 701/41 |
| 2015/0353082 A1* | 12/2015 | Lee ...................... | B60W 30/10 701/41 |
| 2015/0360721 A1 | 12/2015 | Matsuno et al. | |
| 2016/0001781 A1 | 1/2016 | Fung et al. | |
| 2016/0187879 A1 | 6/2016 | Mere et al. | |
| 2016/0225261 A1 | 8/2016 | Matsumoto | |
| 2016/0250968 A1 | 9/2016 | Shirakata et al. | |
| 2016/0272204 A1 | 9/2016 | Takahashi et al. | |
| 2016/0288707 A1 | 10/2016 | Matsumura | |
| 2016/0297431 A1 | 10/2016 | Eigel et al. | |
| 2016/0339913 A1 | 11/2016 | Yamashita et al. | |
| 2017/0108865 A1 | 4/2017 | Rohde et al. | |
| 2017/0124882 A1 | 5/2017 | Wang | |
| 2017/0197637 A1 | 7/2017 | Yamada et al. | |
| 2017/0203763 A1 | 7/2017 | Yamada et al. | |
| 2017/0203764 A1 | 7/2017 | Fujiki et al. | |
| 2017/0240172 A1 | 8/2017 | Nishiguchi et al. | |
| 2017/0240186 A1 | 8/2017 | Hatano | |
| 2017/0243491 A1 | 8/2017 | Fujii et al. | |
| 2017/0313313 A1 | 11/2017 | Asakura | |
| 2017/0315556 A1 | 11/2017 | Mimura | |
| 2017/0334460 A1 | 11/2017 | Arakawa et al. | |
| 2017/0341652 A1 | 11/2017 | Sugawara et al. | |
| 2017/0349212 A1 | 12/2017 | Oshida et al. | |
| 2017/0368936 A1 | 12/2017 | Kojima | |
| 2018/0029604 A1 | 2/2018 | Niino et al. | |
| 2018/0033309 A1 | 2/2018 | Norwood | |
| 2018/0043906 A1 | 2/2018 | Huang | |
| 2018/0046185 A1 | 2/2018 | Sato et al. | |
| 2018/0050659 A1 | 2/2018 | Coburn | |
| 2018/0074497 A1 | 3/2018 | Tsuji et al. | |
| 2018/0088574 A1 | 3/2018 | Latotzki et al. | |
| 2018/0091085 A1 | 3/2018 | Tamagaki et al. | |
| 2018/0111628 A1 | 4/2018 | Tamagaki et al. | |
| 2018/0154939 A1 | 6/2018 | Aoki | |
| 2018/0173225 A1 | 6/2018 | Kim et al. | |
| 2018/0178713 A1 | 6/2018 | Fujii | |
| 2018/0178714 A1 | 6/2018 | Fujii | |
| 2018/0178715 A1 | 6/2018 | Fujii | |
| 2018/0178716 A1 | 6/2018 | Fujii | |
| 2018/0197414 A1 | 7/2018 | Oooka | |
| 2018/0209801 A1 | 7/2018 | Stentz et al. | |
| 2018/0215387 A1 | 8/2018 | Takae | |
| 2018/0239352 A1 | 8/2018 | Wang et al. | |
| 2018/0251155 A1 | 9/2018 | Chan et al. | |
| 2018/0292820 A1 | 10/2018 | Markberger | |
| 2018/0297638 A1 | 10/2018 | Fujii | |
| 2018/0297639 A1 | 10/2018 | Fujii | |
| 2018/0297640 A1 | 10/2018 | Fujii | |
| 2018/0339708 A1* | 11/2018 | Geller ............... | B60W 50/0097 |
| 2018/0345959 A1 | 12/2018 | Fujii | |
| 2018/0345960 A1 | 12/2018 | Fujii | |
| 2018/0346027 A1 | 12/2018 | Fujii | |
| 2018/0350242 A1 | 12/2018 | Fujii | |
| 2018/0370542 A1 | 12/2018 | Braunagel et al. | |
| 2019/0026918 A1 | 1/2019 | Gomezcaballero et al. | |
| 2019/0135290 A1 | 5/2019 | Marden et al. | |
| 2019/0155279 A1 | 5/2019 | Tayama | |
| 2019/0185005 A1* | 6/2019 | Fukuda ................. | G08G 1/167 |
| 2019/0291728 A1 | 9/2019 | Shalev-Shwartz et al. | |
| 2019/0315362 A1 | 10/2019 | Um et al. | |
| 2019/0317494 A1 | 10/2019 | Lee et al. | |
| 2020/0001714 A1 | 1/2020 | Kojima | |
| 2020/0073396 A1 | 3/2020 | Shimizu | |

FOREIGN PATENT DOCUMENTS

| | | |
|---|---|---|
| DE | 10 2004 005815 B3 | 6/2005 |
| DE | 10 2004 048 468 A1 | 4/2006 |
| DE | 10 2007 005 245 A1 | 11/2007 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 10 2016 202946 A1 | 9/2016 |
| DE | 10 2015 206969 A1 | 10/2016 |
| DE | 10 2015 209476 A1 | 11/2016 |
| DE | 10 2015 219231 A1 | 4/2017 |
| DE | 10 2015 224244 A1 | 6/2017 |
| DE | 10 2016 007187 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3264211 A1 | 1/2018 |
| EP | 3284646 A1 | 2/2018 |
| EP | 3075618 A3 | 5/2018 |
| JP | 2003-025868 A | 1/2003 |
| JP | 2015-138330 A | 7/2015 |
| JP | 2016-151815 A | 8/2016 |

(56) References Cited

FOREIGN PATENT DOCUMENTS

| | | | |
|---|---|---|---|
| JP | 2016-196285 | A | 11/2016 |
| KR | 10-0578573 | B1 | 5/2006 |
| KR | 10-1779823 | B1 | 10/2017 |
| KR | 10-2018-0070401 | A | 6/2018 |
| WO | 2010-088869 | A1 | 8/2010 |
| WO | 2012-131405 | A1 | 10/2012 |
| WO | 2014-154771 | A1 | 10/2014 |
| WO | 2017-018133 | A1 | 2/2017 |
| WO | 2017 064941 | A1 | 4/2017 |
| WO | 2017-168013 | A1 | 10/2017 |
| WO | 2018-033389 | A1 | 2/2018 |
| WO | 2017-017793 | A1 | 6/2018 |

OTHER PUBLICATIONS

European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884, 25 pp.
Extended European Search Report dated May 11, 2020 from the corresponding European Application No. 19167265.8, 9 pp.
Office Action dated Jun. 1, 2020 from the corresponding U.S. Appl. No. 16/204,400, 30 pp.
Office Action dated Aug. 12, 2020 from the corresponding U.S. Appl. No. 16/192,279, 31 pp.
Notice of Allowance dated Sep. 4, 2020 from the corresponding U.S. Appl. No. 16/203,884, 15 pp.
Office Action dated Sep. 15, 2020 from the corresponding U.S. Appl. No. 16/206,170, 1 pp.

* cited by examiner

APPARATUS AND METHOD FOR LANE CHANGE CONTROL

CROSS-REFERENCE TO RELATED APPLICATIONS

This application claims priority to and the benefit of Korean Patent Application No. 10-2018-0119957, filed Oct. 8, 2018, which claims priority to and the benefit of U.S. Patent Application No. 62/655,831, filed on Apr. 11, 2018, the entirety of each of which are incorporated herein by reference.

FIELD

The present disclosure relates to an apparatus and method for lane change control.

BACKGROUND

The statements in this section merely provide background information related to the present disclosure and may not constitute prior art.

Recently, a vehicle may be equipped with a plurality of systems for supporting the driving of a driver to enhance his or her driving convenience.

Among such driver supporting systems, a lane change control system may determine a speed, a location, and the like of a surrounding vehicle are suitable for performing a lane change and may control steering torque, a vehicle speed, and the like, thus performing a lane change.

In this case, the lane change control system may determine whether a lane change is possible on the basis of a vehicle located at a rear side of a host vehicle. When it is determined that the lane change is possible, the lane change control system may perform lane change control.

We have discovered that the conventional lane change control system may fail to consider a vehicle located at a front side of the host vehicle when determining whether a lane change is possible.

Furthermore, when it is verified that the lane change is impossible, the lane change control system may notify a driver of state information and does not perform a lane change. In this case, we have also discovered that the lane change control system does not consider a possibility of the lane change based on acceleration or deceleration of the vehicle.

SUMMARY

An aspect of the present disclosure provides an apparatus for lane change control and a method thereof to stably perform the lane change control by determining whether a lane change is possible in consideration of a vehicle located at a front side as well as a vehicle located at a rear side of a host vehicle.

Another aspect of the present disclosure provides an apparatus for lane change control for implementing a more precise lane change control function by predicting whether a lane change is possible in an acceleration or deceleration state in a state where a lane change is impossible and performing lane change control based on acceleration or deceleration depending on the predicted result and a method thereof.

Another aspect of the present disclosure provides an apparatus for lane change control for enhancing the satisfaction of a driver by performing lane change control in consideration of a tendency of the driver for acceleration or deceleration upon lane change control and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for lane change control may include: a determination device configured to determine lane change conditions for a first vehicle and a second vehicle, which are each travelling in a target lane to which a host vehicle performs a lane change, wherein the first vehicle is located behind the host vehicle, and the second vehicle is located in front of the host vehicle, and a controller configured to perform the lane change control for the host vehicle when both the lane change conditions for the first and second vehicles are met.

The apparatus for lane change control may further include a calculation device configured to calculate a first critical distance based on a vehicle speed of the first vehicle and a vehicle speed of the host vehicle and calculate a second critical distance based on a vehicle speed of the second vehicle and the vehicle speed of the host vehicle.

The determination device may be configured to determine that both the lane change conditions for the first and second vehicles are met, when the first and second critical distances are greater than or equal to a reference distance.

The apparatus for lane change control may further include a prediction device configured to determine a speed adjustment range of the host vehicle based on lane change configuration information preset by a driver of the host vehicle when the first or second critical distance is less than a reference distance and predict whether a lane change is possible with acceleration or deceleration of the host vehicle.

The lane change configuration information may include a maximum speed difference for allowing acceleration and a maximum speed difference for allowing deceleration.

The prediction device may be configured to determine the speed adjustment range based on the maximum speed difference for allowing acceleration and the maximum speed difference for allowing deceleration The prediction device may be configured to determine that the lane change is possible with the acceleration, when there are at least one or more first speeds capable of performing the lane change is found within the speed adjustment range corresponding to the maximum speed difference for allowing acceleration on the basis of a setting speed of the host vehicle.

The controller may be configured to determine a target speed with respect to a lower value among the at least one or more first speeds, when it is verified that the lane change is possible with the acceleration.

The prediction device may be configured to determine that the lane change is possible with the deceleration, when there are at least one or more second speeds capable of performing the lane change is found within the speed adjustment range corresponding to the maximum speed difference for allowing deceleration on the basis of a setting speed of the host vehicle.

The controller may be configured to determine a target speed upon lane change control on the basis of a higher value among the at least one or more second speeds, when it is verified that the lane change is possible with the deceleration.

The lane change configuration information may include driving pattern information of the driver of the host vehicle during the lane change control, and the driving pattern includes a constant speed driving, an acceleration in driving, a deceleration in driving, and a selection thereof by the driver of the host vehicle.

When the lane change is possible with the acceleration or the deceleration, the controller may be configured to determine a target speed of the host vehicle based on the acceleration in driving or the deceleration in driving, and the driving pattern information.

When the driving pattern information shows the constant speed driving pattern of the driver, the controller may be configured to set a target speed of the host vehicle based on a lowest value among differences between a setting speed of the host vehicle and speeds capable of performing the lane change within the speed adjustment range.

When the driving pattern information shows the selection pattern by the driver, the controller may be configured to display an information screen on a display and to inquire the driver to select the acceleration or the deceleration for the lane change, and determine the target speed of the host vehicle based on the selection by the driver through the information screen.

According to another aspect of the present disclosure, a method for lane change control may include: determining, by the determination device, lane change conditions for a first vehicle and a second vehicle, wherein the first vehicle is located behind the host vehicle, and the second vehicle is located in front of the host vehicle; and performing, by a controller, the lane change control for the host vehicle based on a set target speed, when both the lane change conditions for the first and second vehicles are met.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
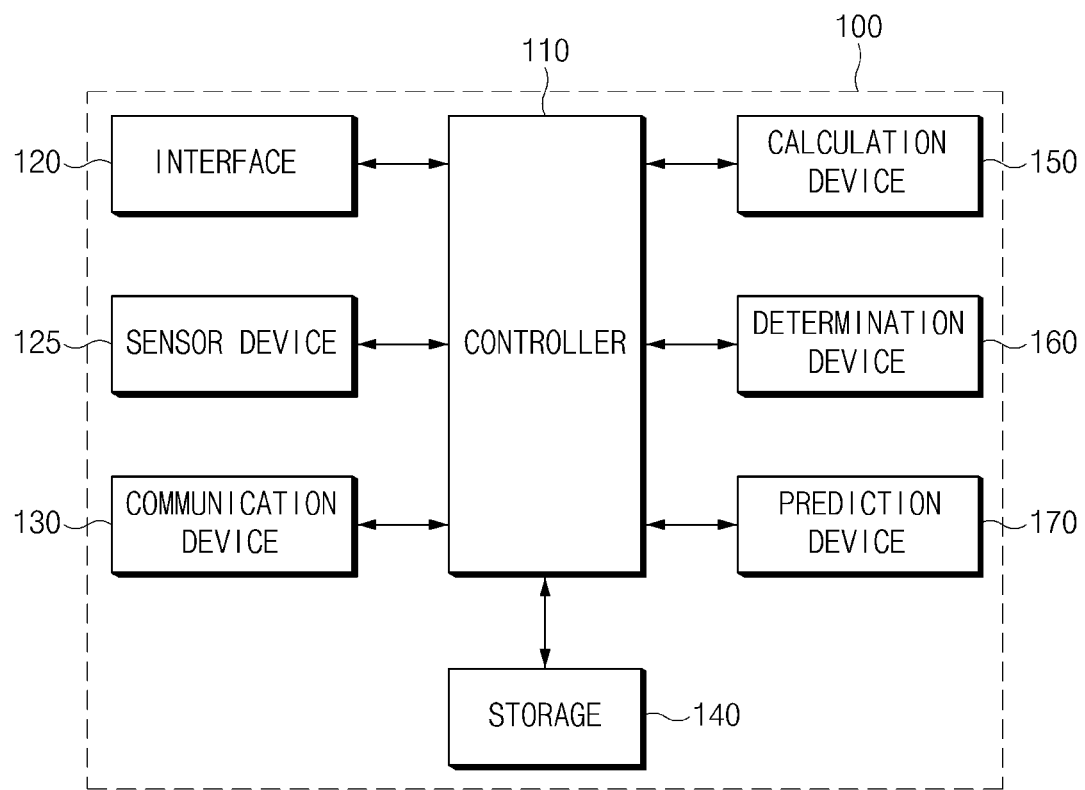
FIG. 1 is a block diagram illustrating a configuration of an apparatus for lane change control.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, in describing an exemplary form of the present disclosure, if it is determined that a detailed description of related well-known configurations or functions blurs the gist of the present disclosure, it will be omitted.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for lane change control according to an exemplary form of the present disclosure.

An apparatus 100 in one form of the present disclosure may be implemented in a vehicle. In this case, the apparatus 100 may be integrated with control units in the vehicle. Furthermore, the apparatus 100 may be implemented independently of the control units in the vehicle and may be connected with the control units of the vehicle by a separate connection means. Herein, the apparatus 100 may be driven as a lane change assist system. The lane change assist system may refer to a system which assists in controlling steering torque and a vehicle speed and safely change a lane without a collision with another vehicle located on a lane to be changed (i.e., a target lane), when a driver wants to change a lane while driving.

Referring to FIG. 1, the apparatus 100 may include a controller 110, an interface 120, a sensor device 125, a communication device 130, a storage 140, a calculation device 150, a determination device 160, and a prediction device 170. Herein, the controller 110, the calculation device 150, the determination device 160, and the prediction device 170 of the apparatus 100 according to an exemplary form of the present disclosure may be implemented as at least one or more processors.

The controller 110 may process a signal transmitted between respective components of the apparatus 100.

The interface 120 include an input means for receiving a command from the driver and an output means for outputting an operation state, an operation result, and the like of the lane change control device 100.

Herein, the input means may include a key button and may further include a mouse, a joystick, a jog shuttle, a stylus pen, and the like. The input means may further include a soft key implemented on a display.

The output means may include the display and may further include a voice output means such as a speaker. In this case, if a touch sensor such as a touch film, a touch sheet, or a touch pad is installed in the display, the display may operate as a touch screen and may be implemented in the form of integrating the input means with the output means.

In this case, the display may include at least one of a liquid crystal display (LCD), a thin film transistor-LCD (TFT-LCD), an organic light-emitting diode (OLED), a flexible display, a field emission display (FED), or a three-dimensional (3D) display.

The sensor device 125 may detect other vehicles which are traveling on a lane (e.g., a target lane) to be change upon lane change control. In this case, the sensor device 125 may include one or more sensors which detect a first vehicle behind a host vehicle on a lane to be changed and a second vehicle in front of the host vehicle on the lane to be changed.

The communication device 130 may include a communication module for supporting a communication interface with electronics, and/or control units mounted on the vehicle. As an example, the communication module may receive information detected by the sensor device 125. Furthermore, the communication module may transmit a control signal of the controller 110 to each drive unit in the vehicle upon lane change control.

Herein, the communication module may include a module for supporting vehicle network communication such as controller area network (CAN) communication, local interconnect network (LIN) communication, flex-ray communication, and Ethernet communication.

The storage 140 may store data, an algorithm, and/or the like desired for operating the apparatus 100.

For example, the storage 140 may store condition information, a command, and/or an algorithm desired to perform a lane change control operation. Furthermore, the storage 140 may store detection information of a first vehicle and a second vehicle and may store a command and/or algorithm for calculating a critical distance based on the detection information of the first vehicle and the second vehicle.

Moreover, the storage 140 may store a command, an algorithm, and/or the like for calculating a critical distance based on the detection information of the first vehicle and the second vehicle, determining whether a lane change is possible, and determining a target speed.

Herein, the storage 140 may include storage media, for example, a random access memory (RAM), a static RAM (SRAM), a read-only memory (ROM), a programmable ROM (PROM), and an electrically erasable PROM (EEPROM).

When a turn signal is activated, the determination device 160 may determine a lane change condition for each of the first vehicle behind a lane to be changed and the second vehicle in front of the lane to be changed, upon lane change control.

Herein, the lane change condition may include a condition where a first critical distance calculated based on a vehicle speed of the first vehicle and a vehicle speed of the host vehicle and a second critical distance calculated based on a vehicle speed of the second vehicle and the vehicle speed of the host vehicle are greater than or equal to a reference distance.

A description will be given for the first critical distance and the second critical distance with reference to FIG. 2.

Figure 2:
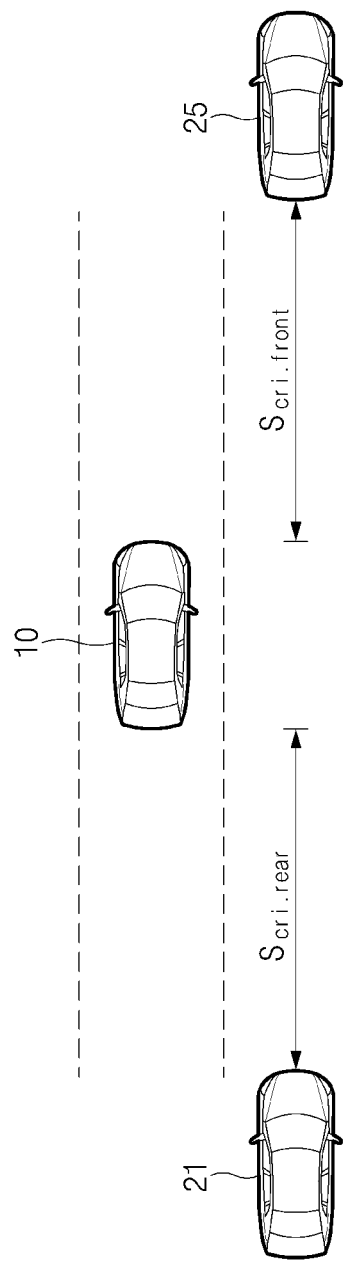
FIG. 2 is a drawing illustrating an operation of calculating a critical distance in an apparatus for lane change control.

FIG. 2 is a drawing illustrating an operation of calculating a critical distance in an apparatus in one form of the present disclosure. As shown in FIG. 2, a first vehicle 21 may be located at a rear side of a host vehicle 10, that is, behind a host vehicle, traveling on a target lane to which the host vehicle will make the lane change. In this case, a first critical distance may refer to a distance considering risk to the first vehicle 21 when the host vehicle 10 performs lane change control to the lane to be changed.

Thus, a calculation device 150 of FIG. 1 may calculate the first critical distance from the first vehicle 21 with reference to Equation 1 below.

$$S_{cri.rear} = (V_{rear} - V) \times t_B + \frac{(V_{rear} - V)^2}{(2 \times a)} + V \times t_G \quad \text{[Equation 1]}$$

In Equation 1 above, $S_{cri.rear}$ may denote the first critical distance from the first vehicle 21, $V_{rear}$ may denote a lower value between a real vehicle speed of the first vehicle 21 and a maximum speed limit (e.g., 130 km/h), V may denote a real vehicle speed of the host vehicle 10, $t_B$ may denote a time (e.g., 0.4 seconds) desired until the first vehicle 21 starts to decelerate after lane change control starts, a may denote a deceleration value (e.g., 3 m/s²) of the first vehicle 21, and $t_G$ may denote a time (e.g., 1 second) relative to V for a clearance between vehicles after deceleration of the first vehicle 21.

The second vehicle 25 may be located at a front side of the host vehicle 10, that is, in front of the host vehicle, travelling on the target lane. In this case, a second critical distance may refer to a distance considering risk to the second vehicle 25 when the host vehicle 10 performs lane change control to the target lane.

A calculation device 150 of FIG. 1 may calculate the second critical distance from the second vehicle 25 with reference to Equation 2 below.

$$S_{cri.front} = (V - V_{front}) \times t_m + \frac{(V_{front} - V)^2}{(2 \times a_S)} + V \times t_G \quad \text{[Equation 2]}$$

In Equation 2 above, $S_{cri.front}$ front may denote the second critical distance from the second vehicle 25, V may denote a real vehicle speed of the host vehicle 10, $V_{front}$ may denote a higher value between a real vehicle speed of the second vehicle 25 and a minimum speed limit, $t_m$ may denote a time desired until the host vehicle 10 detects the second vehicle 25 after lane change control starts, $a_s$ may denote a deceleration value of the second vehicle 25, and $t_G$ may denote a time relative to V for a clearance between vehicles after an approaching vehicle decelerates.

When the calculated first and second critical distances are greater than or equal to a reference distance, a determination device 160 of FIG. 1 may determine whether both of lane change conditions for the first and second vehicles are met. Herein, the reference distances may include a reference distance for the first critical distance and a reference distance for the second critical distance.

In this case, a controller 110 of FIG. 1 may perform lane change control. Herein, the controller 110 may generate a control signal for lane change control and may output the generated control signal to each drive system in a vehicle, for example, a steering system, an accelerator, a brake, and/or the like.

Meanwhile, when the first critical distance or the second critical distance is less than the reference distance, the determination device 160 may determine that the lane change conditions are not met. When the lane change condition for the first or second vehicle is not met, the determination device 160 may determine that a lane change is impossible.

When it is verified that the lane change is impossible based on the lane change condition, a prediction device 170 of FIG. 1 may determine a speed adjustment range of the host vehicle 10 based on lane change configuration information preset by the driver.

Herein, the lane change configuration information may include a maximum speed difference for allowing acceleration and a maximum speed difference for allowing deceleration with respect to a setting speed of the host vehicle 10. The prediction device 170 may determine a speed adjustment range relative to the setting speed of the host vehicle 10 based on the maximum speed difference for allowing acceleration and the maximum speed difference for allowing deceleration, included in the lane change configuration information.

As an example, when the setting speed of the host vehicle 10 is 100 kph, when the maximum speed difference for allowing deceleration is 1 kph, and when the maximum speed difference for allowing acceleration is 3 kph, the prediction device 170 may determine the speed adjustment range as a range of 98 kph to 103 kph.

The prediction device 170 may predict whether a lane change by acceleration or deceleration is possible within the determined speed adjustment range. In this case, the prediction device 170 may predict a situation where lane change control is performed, with respect to each speed within the determined speed adjustment range and may determine whether a lane change is possible for each speed.

Herein, when there are at least one or more first speeds capable of performing a lane change within a speed adjustment range corresponding to the maximum speed difference for allowing acceleration with respect to the setting speed of the host vehicle 10, the prediction device 170 may determine that the lane change by acceleration is possible. Furthermore, when there are at least one or more second speeds capable of performing a lane change among speeds slower than the setting speed of the host vehicle 10 within the speed adjustment range, the prediction device 170 may determine that the lane change by deceleration is possible.

Meanwhile, when it is determined that both the lane changes by the acceleration and the deceleration are impossible, the controller 110 may notify a driver of it. In this case, the controller 110 may configure a first information screen for notifying the driver that the lane change is impossible and may display the first information screen on a display of an interface 120 of FIG. 1. A description will be given for the first information screen with reference to FIG. 3A.

Figure 3A:
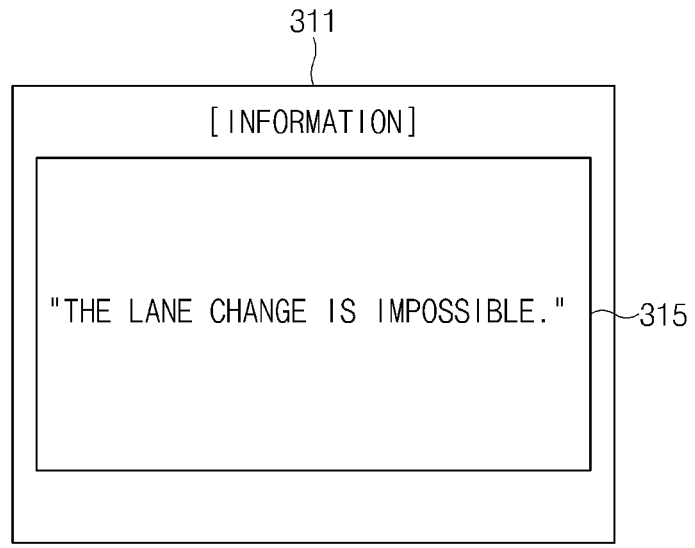
FIGS. 3A to 3D are drawings illustrating information screens.

FIGS. 3A to 3D are drawings illustrating information screens in one form of the present disclosure. As shown in FIG. 3A, a first information screen 311 may include an information message 315 "The lane change is impossible." Thus, a driver may recognize a state where the lane change is impossible, through the information message 315 on the first information screen 311.

When a state where a lane change by acceleration is possible is verified, a controller 110 of FIG. 1 may determine an acceleration based target speed on the basis of a lower value among at least one or more first speeds.

Furthermore, when a state where a lane change by deceleration is possible is verified, the controller 110 may determine a deceleration based target speed on the basis of a higher value among at least one or more second speeds.

Meanwhile, lane change configuration information may further include information about a tendency of the driver associated with lane change control (namely, a driving pattern information). For example, the lane change configuration information may include the driving pattern information indicating whether the driver usually performs the lane change control while accelerating, decelerating of the host vehicle, or at a constant speed of the host vehicle, or by selecting any of these (e.g., the acceleration, deceleration, constant speed driving patterns), namely, a driver selection type.

The controller 110 may determine a target speed in consideration of information about the driving pattern of the driver for the lane change control. In other words, when the driving pattern of the driver shows the acceleration driving pattern during the lance change, the controller 110 may determine an acceleration based target speed as a target speed of a host vehicle. Herein, although the driving pattern of the driver is the acceleration driving pattern, when an acceleration based lane change is impossible, the controller 110 may determine a deceleration based target speed as a target speed of the host vehicle.

Meanwhile, when the driving pattern of the driver for the lane change is the deceleration driving pattern, the controller 110 may determine a deceleration based target speed as a target speed of the host vehicle. Herein, although the driving pattern of the driver is the deceleration driving pattern, when a deceleration based lane change is impossible, the controller 110 may determine an acceleration based target speed as a target speed of the host vehicle.

When the driving pattern of the driver for the lane change is the constant speed driving pattern, the controller 110 may determine a target speed of the host vehicle on the basis of a value in which a difference with a setting speed of the host vehicle between the deceleration based target speed and the acceleration based target speed is small.

When the target speed of the host vehicle is determined, the controller 110 may perform lane change control based on the determined target speed.

In this case, the controller 110 may configure an information screen for a situation where lane change control is performed and may display the information screen on a display of an interface 120 of FIG. 1.

Figure 3B:
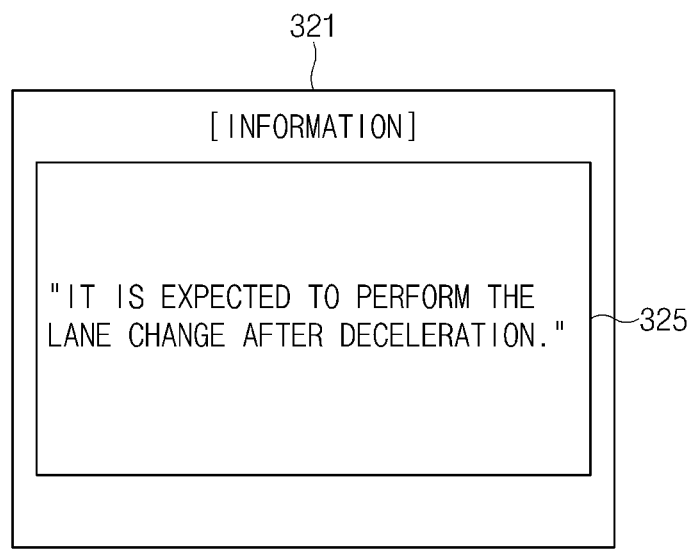

For example, when a target speed of the host vehicle is set on the basis of the deceleration based target speed, as shown in FIG. 3B, the controller 110 may configure a second information screen 321 for notifying the driver of a situation where a lane change by deceleration is performed through the information message 325 "It is expected to perform a lane change after deceleration." and may display the second information screen 321 on the display.

Figure 3C:
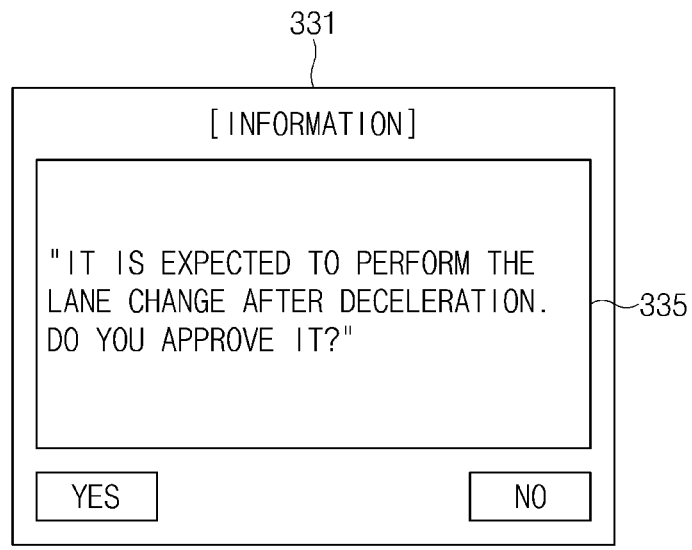

For another example, when a target speed of the host vehicle is set on the basis of the deceleration based target speed, as shown in FIG. 3C, the controller 110 may configure a third information screen 331 for notifying the driver of a situation where a lane change by deceleration is performed through the query message 325, "It is expected to perform a lane change after deceleration. Do you approve it?", for requesting an approval for lane change control by deceleration and may display the third information screen 331 on the display. In this case, when "Yes" on the third information screen 331 is selected by the driver, the controller 110 may perform lane change control based on deceleration.

Figure 3D:
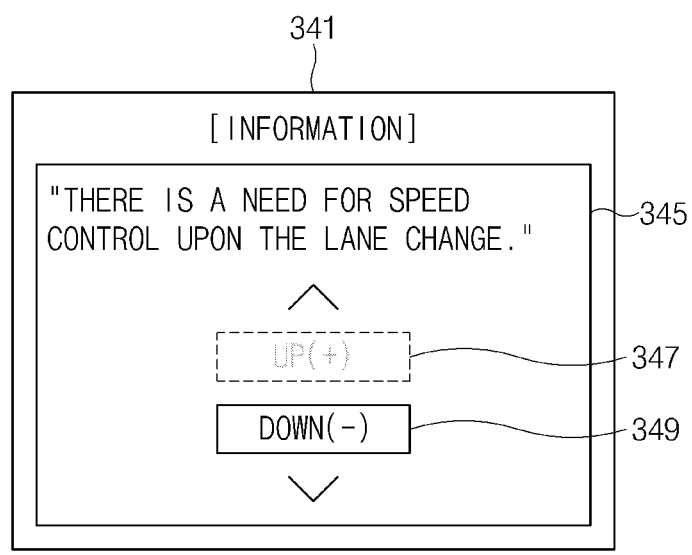

Meanwhile, when the information about the tendency of the driver is set to information about a driver selection type, as shown in FIG. 3D, the controller 110 may display a fourth information screen 341 for inquiring about whether to accelerate or decelerate on the display of the interface 120. The controller 110 may determine a target speed of the host vehicle with respect to any one of the deceleration based target speed and the acceleration based target speed depending on driver feedback input through the fourth information screen 341.

Referring to FIG. 3D, the fourth information screen 341 may include selection buttons 347 and 349 for an "up (+)"

direction and a "down (−)" direction, together with the information message 345 "There is a need for speed control upon lane change.".

The driver may select an acceleration or deceleration type by selecting the selection button 347 or 349 for the "up (+)" or "down (−)" direction. In this case, the controller 110 may determine a target speed of the host vehicle on the basis of any one of the deceleration based target speed or the acceleration based target speed depending on the selection of the driver.

Herein, when a lane change by acceleration is impossible, the controller 110 may deactivate the selection button 347 corresponding to the "up (+)" direction. When a lane change by deceleration is impossible, the controller 110 may deactivate the selection button 349 corresponding to the "down (−)" direction.

In this case, the controller 110 may perform lane change control based on the determined target speed.

The apparatus 100 in one form of the present disclosure may be implemented in the form of an independent hardware device including a memory and a processor for processing each operation or may be driven in the form of being included in another hardware device such as a microprocessor or a universal computer system.

A description will be given in detail of an operation of the apparatus 100 including the above-mentioned components.

FIGS. 4 to 7B are flowcharts illustrating a method for lane change control according to another exemplary form of the present disclosure.

Figure 4:
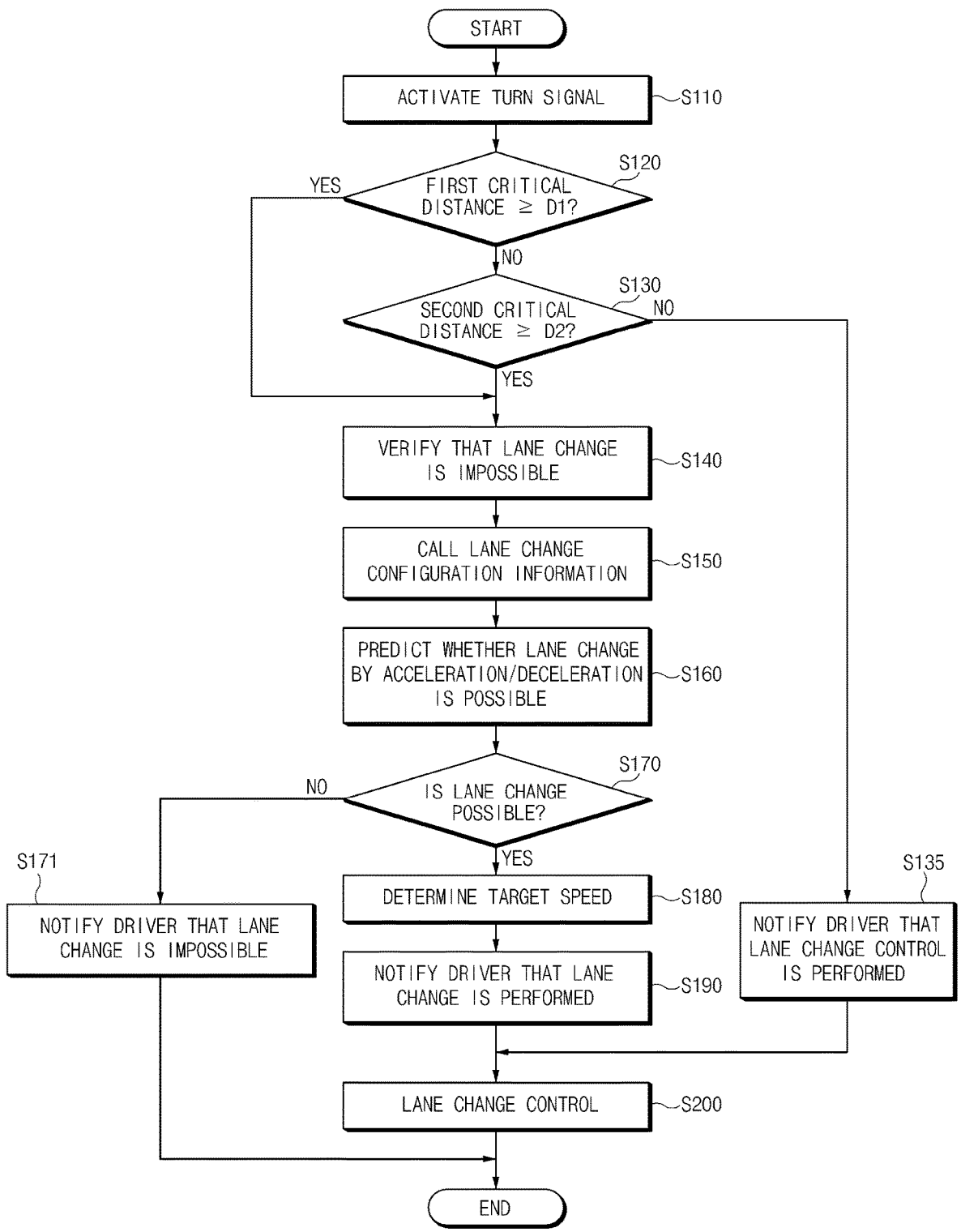
FIGS. 4 to 7B are flowcharts illustrating a method for lane change control.

Referring to FIG. 4, when a turn signal is activated in operation S110, in operation S120, an apparatus may determine whether a first critical distance calculated for a first vehicle behind a lane to be changed is greater than or equal to a reference distance D1. In operation S130, the apparatus may determine whether a second critical distance calculated for a second vehicle in front of the lane to be changed is greater than or equal to a reference distance D2.

When both the first and second critical distances are greater than or equal to the reference distances D1 and D2, respectively, in operations S120 and S130, in operation S135, the apparatus may determine that both of lane change conditions for the first and second vehicles are met and may notify the driver of a state where lane change control is performed. In operation S200, the apparatus may perform lane change control.

Meanwhile, when the first or second critical distance is less than the reference distance D1 or D2 in operation S120 or S130, in operation S140, the apparatus may determine that the lane change conditions are not met and may verify that a lane change is impossible.

When it is verified that the lane change is impossible in operation S140, in operation S150, the apparatus may call lane change configuration information preset by the driver. In operation S160, the apparatus may predict whether a lane change by acceleration/deceleration is possible, based on the lane change configuration information called in operation S150.

In operation S160, the apparatus 100 may determine a speed adjustment range relative to a setting speed of a host vehicle based on a maximum speed difference for allowing acceleration and a maximum speed difference for allowing deceleration included in the lane change configuration information and may predict a situation where lane change control is performed, with respect to each speed in the determined speed adjustment range, thus determining whether a lane change is possible for each speed.

When it is verified that the lane change is impossible in operation S170, in operation S171, the apparatus 100 may configure an information screen and may notify the driver that the lane change is impossible to end the process.

On the other hand, when it is verified that the lane change is possible in operation S170, in operation S180, the apparatus 100 may determine a target speed. In operation S190, the apparatus 100 may notify the driver that a lane change is performed by speed adjustment.

In operation S200, the apparatus 100 may perform lane change control on the basis of the changed target speed.

Figure 5:
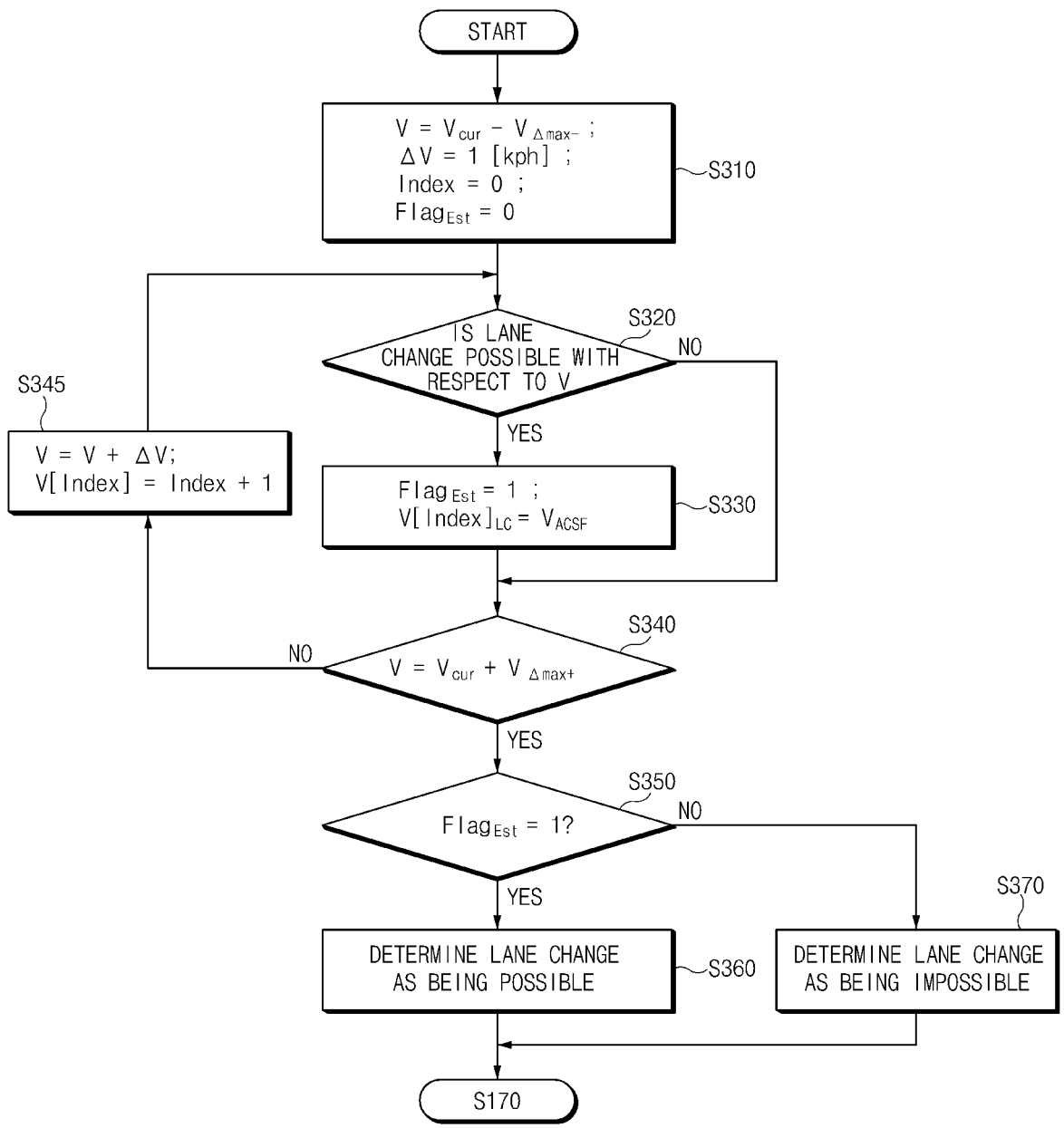

FIG. 5 illustrates a detailed operation of operation S160 of FIG. 4.

Referring to FIG. 5, in operation S310, an apparatus 100 may set initial variables, for example, "V=$V_{cur}$−$V_{\Delta max-1}$", "ΔV=1 kph", "Index=0", and "$Flag_{Est}$=0". In this case, in operation S320, the apparatus 100 may predict whether a lane change is possible on the basis of the set V.

When the lane change is possible on the basis of V in operation S320, in operation S330, the apparatus 100 may set variables, for example, "FlagEst=1" and "V[Index]$_{LC}$=V".

Meanwhile, when the lane change is impossible on the basis of V in operation S320, the apparatus 100 may omit operation S330.

In operation S345, the apparatus 100 may increase V by ΔV and may increase the index by 1 until "V=$V_{cur}$+$V_{\Delta max+}$" and may repeat operation S320.

When "V=$V_{cur}$+$V_{\Delta max+}$" in operation S340, in operations S350 to S370, the apparatus 100 may determine a state where the lane change is possible or impossible depending on whether there is "V[Index]$_{LC}$=C" where "$Flag_{Est}$=1".

Figure 6:
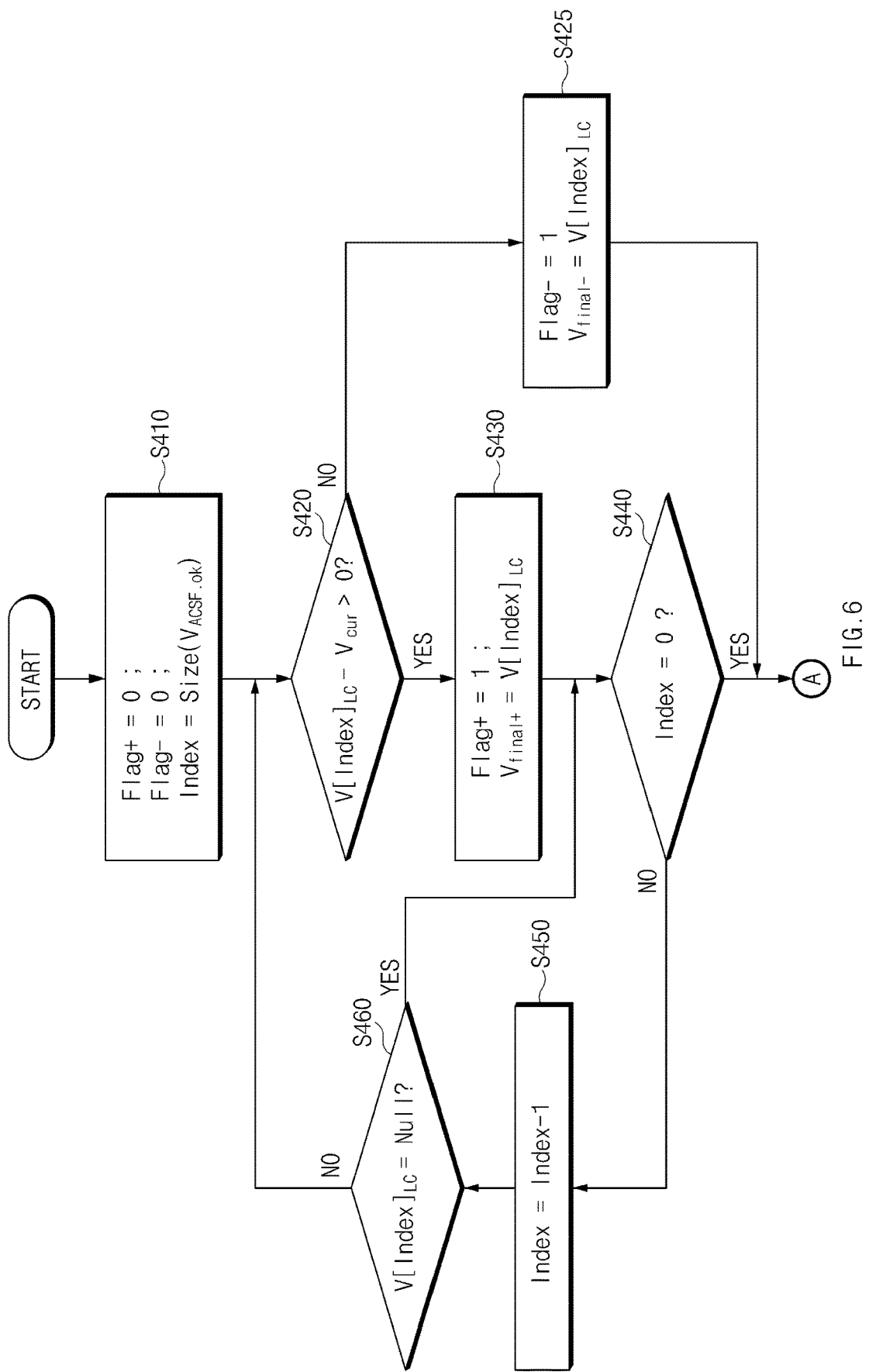
Figure 7A:
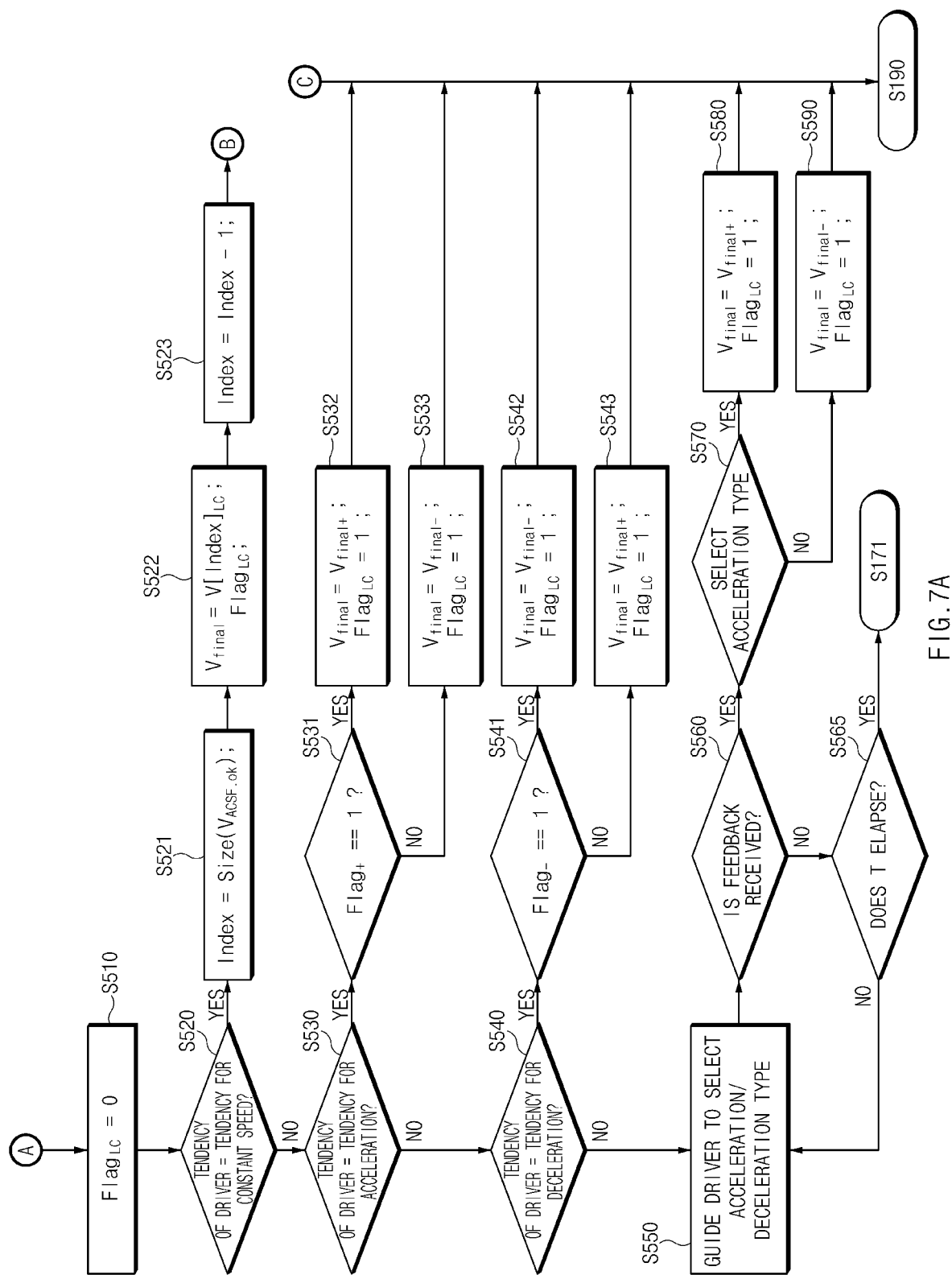
Figure 7B:
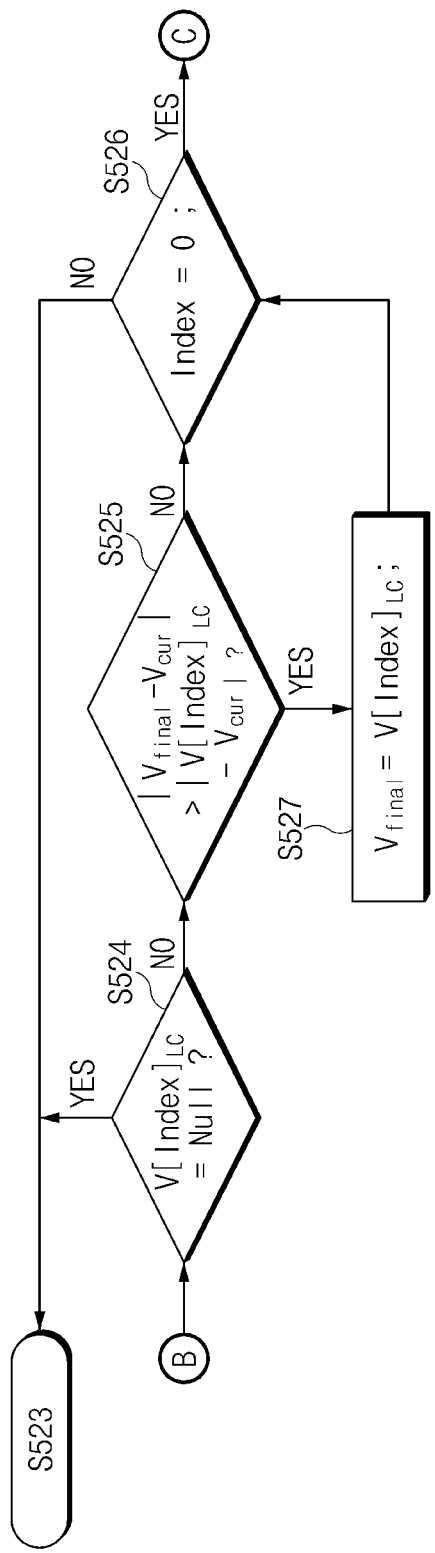

FIGS. 6, 7A and 7B illustrate a detailed operation of operation S180 of FIG. 4.

First of all, referring to FIG. 6, in operation S410, an apparatus 100 may set initial variables, for example, "Flag+=0", "Flag−=0", and "Index=size ($V_{ok}$)". Herein, "Index=size($V_{ok}$)" may refer to an index value in which there is a real vehicle speed V of a host vehicle capable of performing a lane change in the process of FIG. 5, and an initial value of an index may be set to the highest value among index values.

When "V[index]$_{LC}$−$V_{cur}$>0" in operation S420, in operation S430, the apparatus 100 may set variables, for example, "Flag+=1" and "$V_{final+}$=V[Index]$_{LC}$". When "V[index]$_{LC}$−$V_{cur}$≤0" in operation S420, in operation S425, the apparatus 100 may set variables, for example, "Flag−=1" and "$V_{final-}$=V[Index]$_{LC}$". The apparatus 100 may decrease the index by 1 until "Index=0" and may repeat operations S420 to S440.

Thereafter, the apparatus 100 may perform the process from A of FIG. 7A.

The apparatus 100 may determine a target speed in consideration of a driving pattern of a driver for the lane change.

Referring to FIGS. 7A and 7B, in operation S510, the apparatus 100 may set an initial variable, for example, "$Flag_{LC}$=0" and may determine the driving pattern of the driver from lane change configuration information.

When the driving pattern of the driver is a constant speed driving pattern in operation S520, the apparatus 100 may perform operations S521 to S523 of FIG. 7A and S524 to S527 of FIG. 7B, and may set a target speed on the basis of a speed with the lowest difference with a setting speed of a vehicle among speeds capable of performing a lane change.

Meanwhile, when the driving pattern of the driver for the lane change is an acceleration driving pattern in operation S530, in operation S531, the apparatus 100 may verify whether "Flag+=1" by the process of FIG. 6. "Flag+=1" may mean that a lane change acceleration is possible. Thus, when "Flag+=1" in operation S531, in operation S532, the apparatus 100 may set a target speed of a host vehicle, for example, "$V_{final}=V_{final+}$", and may set a variable, for example, "$Flag_{LC}=1$". Meanwhile, when "Flag+≠1" in operation S531, in operation S533, the apparatus 100 may set the target speed of the host vehicle, for example, "$V_{final}=V_{final-}$" and may set a variable, for example, "$Flag_{LC}=1$".

Meanwhile, when the driving pattern of the driver for the lane change is a deceleration driving pattern in operation S540, in operation S541, the apparatus 100 may verify whether "Flag-=1" by the process of FIG. 6. "Flag-=1" may mean that a lane change by deceleration is possible. Thus, when "Flag-1=1" in operation S541, in operation S542, the apparatus 100 may set the target speed of the host vehicle, for example, "$V_{final}=V_{final-}$" and may set a variable, for example, "$Flag_{LC}=1$". Meanwhile, when "Flag-≠1" in operation S541, in operation S543, the apparatus 100 may set the target speed of the host vehicle, for example, "$V_{final}=V_{final+}$" and may set a variable, for example, "$Flag_{LC}=1$".

Meanwhile, when the driving pattern of the driver is not set to any one of the patterns, i.e., the constant speed driving, the acceleration driving, or the deceleration driving, in operation S550, the apparatus 100 may guide the driver to select an acceleration/deceleration type.

Thereafter, when driver feedback of the acceleration type is received through operation S550 in operations S560 and S570, in operation S580, the apparatus 100 may set the target speed of the host vehicle, for example, "$V_{final}=V_{final+}$" and may set a variable, for example, "$Flag_{LC}=1$". Meanwhile, when driver feedback of the acceleration type is received through operation S550 in operations S560 and S570, in operation S590, the apparatus 100 may set the target speed of the host vehicle, for example, "$V_{final}=V_{final-}$" and may set the variable, for example, "$Flag_{LC}=1$".

Meanwhile, when driver feedback is not received over time T through operation S550 in operation S565, the apparatus 100 may perform operation S171 of FIG. 4.

Figure 8:
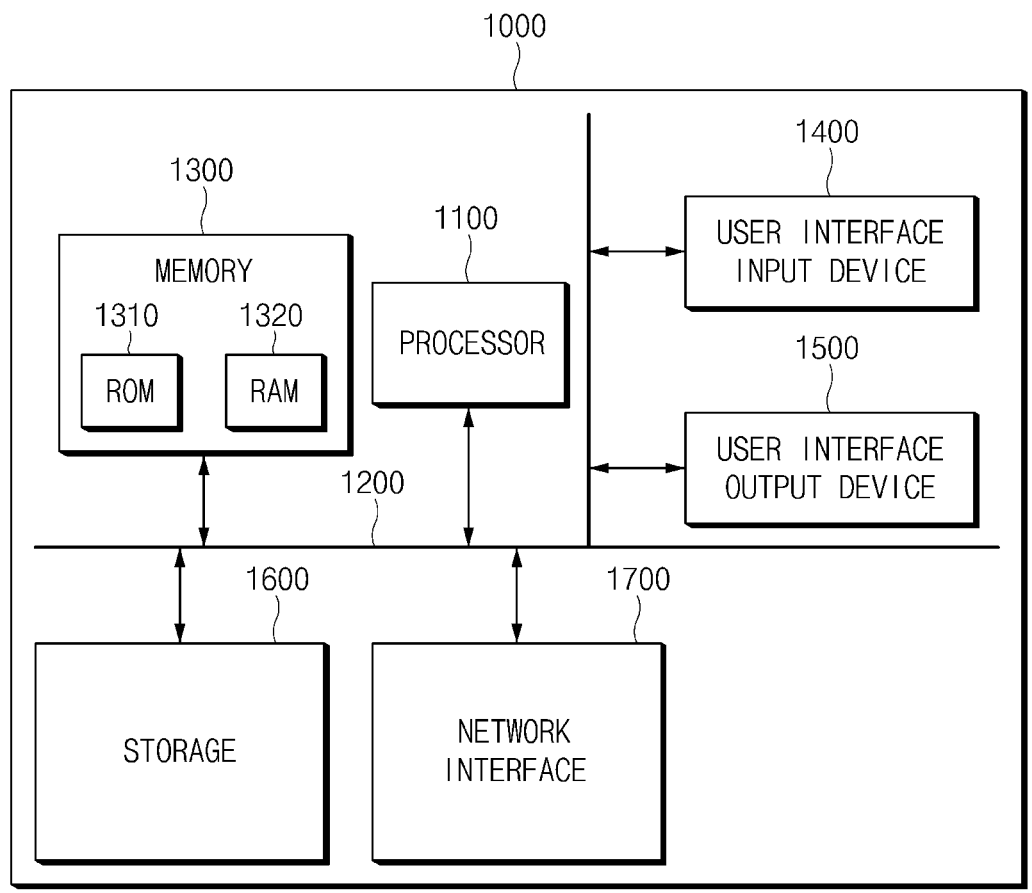
FIG. 8 is a block diagram illustrating a configuration of a computing system which executes a method for lane change control.

FIG. 8 is a block diagram illustrating a configuration of a computing system which executes a method according to an exemplary form of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

According to another form of the present disclosure, the apparatus 100 may stably perform lane change control by determining whether a lane change is possible in consideration of a vehicle located at a front side of a host vehicle as well as a vehicle located at a rear side of the host vehicle upon lane change control.

Furthermore, in other form of the present disclosure, the apparatus 100 may implement a more precise lane change control function by predicting whether a lane change is possible in an acceleration or deceleration state in a state where a lane change is impossible and performing lane change control based on acceleration or deceleration depending on the predicted result. The apparatus 100 may enhance the satisfaction of the driver by performing lane change control in consideration of a tendency of the driver for acceleration or deceleration upon lane change control.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for a lane change control, comprising:
   a determination device configured to determine lane change conditions for a first vehicle and a second vehicle, which are each travelling in a target lane to which a host vehicle performs a lane change, wherein the first vehicle is located behind the host vehicle, and the second vehicle is located in front of the host vehicle;
   a controller configured to perform the lane change control for the host vehicle when both the lane change conditions for the first and second vehicles are met; and
   a prediction device configured to:
      determine a speed adjustment range of the host vehicle based on lane change configuration information preset by a driver of the host vehicle when a first critical distance or a second critical distance is less than a reference distance, and
      predict whether a lane change is possible with acceleration or deceleration of the host vehicle within the speed adjustment range,
   wherein:
      the lane change configuration information comprises a maximum speed difference for allowing acceleration and a maximum speed difference for allowing deceleration, and
      the prediction device is configured to determine the speed adjustment range based on the maximum speed difference for allowing acceleration and the maximum speed difference for allowing deceleration.

2. The apparatus according to claim 1, further comprising:
   a calculation device configured to calculate the first critical distance based on a vehicle speed of the first vehicle and a vehicle speed of the host vehicle and to calculate the second critical distance based on a vehicle speed of the second vehicle and the vehicle speed of the host vehicle.

3. The apparatus according to claim 2, wherein the determination device is configured to:
when the first and second critical distances are greater than or equal to a reference distance, determine that both the lane change conditions for the first and second vehicles are met.

4. The apparatus according to claim 1, wherein the prediction device is configured to:
determine that the lane change is possible with the acceleration, when at least one first speed capable of performing the lane change is found within the speed adjustment range corresponding to the maximum speed difference for allowing acceleration based on a setting speed of the host vehicle.

5. The apparatus according to claim 4, wherein the controller is configured to:
determine a target speed with respect to a lower value among the at least one first speed, when the lane change is possible with the acceleration.

6. The apparatus according to claim 1, wherein the prediction device is configured to:
determine that the lane change is possible with the deceleration, when at least one second speed capable of performing the lane change is found within the speed adjustment range corresponding to the maximum speed difference for allowing deceleration based on a setting speed of the host vehicle.

7. The apparatus according to claim 6, wherein the controller is configured to:
when it is determined that the lane change by the deceleration is possible, determine a target speed for the lane change control based on a higher value among the at least one second speed.

8. The apparatus according to claim 1, wherein the lane change configuration information comprises driving pattern information of the driver of the host vehicle during the lane change control, and the driving pattern includes a constant speed driving, an acceleration in driving, a deceleration in driving, and a selection thereof by the driver.

9. The apparatus according to claim 8, wherein the controller is configured to:
when the lane change is possible with the acceleration or the deceleration, determine a target speed of the host vehicle based on the acceleration in driving or the deceleration in driving, and the driving pattern information.

10. The apparatus according to claim 9, wherein the controller is configured to:
when the driving pattern information shows the constant speed driving pattern of the driver, determine the target speed of the host vehicle based on a lowest value among differences between a setting speed of the host vehicle and speeds capable of performing the lane change within the speed adjustment range.

11. The apparatus according to claim 9, wherein the controller is configured to:
when the driving pattern information shows the selection pattern by the driver, display an information screen on a display and to inquire the driver to select the acceleration or the deceleration for the lane change; and
determine the target speed of the host vehicle based on the selection by the driver through the information screen.

12. A method for a lane change control, the method comprising:
determining, by a determination device, lane change conditions for a first vehicle and a second vehicle, wherein the first vehicle is located behind a host vehicle, and the second vehicle is located in front of the host vehicle; and
performing, by a controller, the lane change control for the host vehicle based on a set target speed, when both the lane change conditions for the first and second vehicles are met,
wherein determining the lane change conditions comprises:
calculating, by a calculating device, a first critical distance based on a vehicle speed of the first vehicle and a vehicle speed of the host vehicle;
calculating, by the calculating device, a second critical distance based on a vehicle speed of the second vehicle and the vehicle speed of the host vehicle;
determining, by a prediction device, a speed adjustment range of the host vehicle based on lane change configuration information preset by a driver of the host vehicle when the first critical distance or the second critical distance is less than a reference distance, and predicting whether a lane change is possible with an acceleration in driving or a deceleration in driving of the host vehicle within the speed adjustment range, wherein the lane change configuration information comprises a maximum speed difference for allowing acceleration and a maximum speed difference for allowing deceleration; and
determining, by the prediction device, the speed adjustment range based on the maximum speed difference for allowing acceleration and the maximum speed difference for allowing deceleration.

13. The method according to claim 12, wherein determining the lane change conditions comprises:
when the first and second critical distances are greater than or equal to a reference distance, determining that both the lane change conditions for the first and second vehicles are met.

14. The method according to claim 12, further comprising:
when the lane change is possible with the acceleration or the deceleration of the host vehicle, determining the target speed of the host vehicle based on the acceleration or the deceleration of the host vehicle, as well as driving pattern information of the driver of the host vehicle, wherein the driving pattern information is included in the lane change configuration information; and
performing the lane change control based on the determined target speed.

15. The method according to claim 14,
wherein predicting whether the lane change is possible comprises:
determining that the lane change is possible with the acceleration, when at least one first speed capable of performing the lane change is found within the speed adjustment range corresponding to the maximum speed difference for allowing acceleration based on a setting speed of the host vehicle; and
determining that the lane change is possible with the deceleration, when at least one second speed capable of performing the lane change is found within the speed adjustment range corresponding to the maximum speed difference for allowing deceleration based on the setting speed of the host vehicle.

16. The method according to claim 14, wherein the driving pattern information of the driver comprises a constant speed driving, an acceleration in driving, a deceleration in driving, or a selection thereof by the driver during the lane change control; and wherein determining the target speed comprises:

when the driving pattern information shows the selection pattern by the driver, displaying an information screen on a display and inquiring the driver to select the acceleration or the deceleration for the lane change; and determining the target speed of the host vehicle based on the selection by the driver through the information screen.

\* \* \* \* \*